(12) United States Patent
Hwang et al.

(10) Patent No.: US 11,153,782 B2
(45) Date of Patent: Oct. 19, 2021

(54) METHOD AND APPARATUS FOR DISTRIBUTING PACKETS ON MULTI-LINK IN MOBILE COMMUNICATION NETWORK

(71) Applicant: Samsung Electronics Co., Ltd., Suwon-si (KR)

(72) Inventors: Jaehyun Hwang, Anyang-si (KR); Seongryong Kang, Seongnam-si (KR); Daejoong Kim, Yongin-si (KR); Sangheon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/606,959

(22) PCT Filed: Apr. 23, 2018

(86) PCT No.: PCT/KR2018/004688
§ 371 (c)(1),
(2) Date: Oct. 21, 2019

(87) PCT Pub. No.: WO2018/194433
PCT Pub. Date: Oct. 25, 2018

(65) Prior Publication Data
US 2020/0169918 A1    May 28, 2020

(30) Foreign Application Priority Data

Apr. 21, 2017 (KR) .................. 10-2017-0051380

(51) Int. Cl.
*H04W 28/08* (2009.01)
*H04L 12/709* (2013.01)
*H04L 12/721* (2013.01)

(52) U.S. Cl.
CPC .......... *H04W 28/08* (2013.01); *H04L 45/245* (2013.01); *H04L 45/70* (2013.01)

(58) Field of Classification Search
CPC ...... H04W 28/08; H04L 45/245; H04L 45/70; H04L 45/24; H04L 45/16
See application file for complete search history.

(56) References Cited

U.S. PATENT DOCUMENTS 9,264,353 B2    2/2016 Krishnaswamy et al.
2013/0132604 A1    5/2013 Cohen et al.
(Continued)

FOREIGN PATENT DOCUMENTS

CN    103685054 A    3/2014
CN    103918304 A    7/2014
(Continued)

OTHER PUBLICATIONS

ISA/KR, International Search Report and Written Opinion of the International Searching Authority, International Application No. PCT/KR2018/004688, dated Aug. 2, 2018, 13 pages.
Demaria, Fabrizio, "Security Evaluation of Multipath TCP, Analyzing and fixing Multipath TCP vulnerabilities, contributing to the Linux Kernel implementation of the new version of the protocol," KTH Royal Institute of Technology, Master of Science in Computer Engineering, Mar. 2016, 87 pages.
(Continued)

*Primary Examiner* — Walter J Divito

(57) ABSTRACT

Disclosed is a 5G or pre-5G communication system for supporting a data transmission rate higher than that of a 4G communication system such as an LTE. A transmitting device supporting a plurality of radio links in a mobile communication network is provided. The transmitting device includes a packet distributor configured to receive feedback information on a plurality of links from a receiving device and distribute packets to the plurality of links based on the feedback information, and output ports corresponding to the plurality of links and configured to transmit the distributed packets through the plurality of links.

6 Claims, 14 Drawing Sheets

(56) References Cited

U.S. PATENT DOCUMENTS

| | | |
|---|---|---|
| 2015/0085800 A1 | 3/2015 | Sivanesan et al. |
| 2016/0072702 A1 | 3/2016 | Gao et al. |
| 2016/0219024 A1* | 7/2016 | Verzun ................. H04L 63/102 |
| 2017/0041100 A1 | 2/2017 | Xie et al. |
| 2017/0078356 A1 | 3/2017 | Yi et al. |
| 2017/0164263 A1 | 6/2017 | Lindoff et al. |

FOREIGN PATENT DOCUMENTS

| | | |
|---|---|---|
| CN | 104753627 A | 7/2015 |
| CN | 106488345 A | 3/2017 |
| WO | 2015188874 A1 | 12/2015 |

OTHER PUBLICATIONS

Liu, Jungie et al., "Multipath and Rate Stability," Washington University in St. Louis, Washington University Open Scholarship, All Computer Science and Engineering Research, Computer Science and Engineering, Originally Published in Proc. IEEE Globecom Conference—CQRM: Communication QoS, Reliability & Modeling Symposium, Dec. 2016, 8 pages.

Supplementary European Search Report in connection with European Application No. 18787167.8 dated Jan. 22, 2020, 10 pages.

Notification of the First Office Action dated May 31, 2021, in connection with Chinese Application No. 201880019272.2, 24 pages.

* cited by examiner

METHOD AND APPARATUS FOR DISTRIBUTING PACKETS ON MULTI-LINK IN MOBILE COMMUNICATION NETWORK

CROSS-REFERENCE TO RELATED APPLICATIONS

This application is a 371 National Stage of International Application No. PCT/KR2018/004688, filed Apr. 23, 2018, which claims priority to Korean Patent Application No. 10-2017-0051380, filed Apr. 21, 2017, the disclosures of which are herein incorporated by reference in their entirety.

BACKGROUND

1. Field

The disclosure relates to a mobile communication technology and, in particular, to a multilink packet distribution method and apparatus.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

Standardization of the 5G as a next generation wireless communication technology is underway in an environment where various wireless communication technologies such as 3G, 4G (e.g., LTE), and WLAN (e.g., Wi-Fi) are being deployed in an interwoven manner. In such an environment where various wireless communication technologies are used, for achieving optimal performance it is very important to make a determination on which technology is to be used at which timing. Throughput, cost, and safety may be considered as performance determination metrics. In the case of determining the performance from the throughput viewpoint, the best method is to maximize a bandwidth by using all available radio channels simultaneously. For example, simultaneous use of all available LTE, 5G, and Wi-Fi links may be considered for data transmission through bandwidth aggregation for aggregating bandwidths of the links.

Typically, such bandwidth aggregation can be realized by distributing packets to multiple radio links. That is, the bandwidth aggregation can be achieved by transmitting a packet alternately on the links. In the case of transmitting sufficiently large data over two links similar in bandwidth to each other, it may be possible to expect a performance to the extent when the bandwidths of the two links are aggregated through packet distribution. However, the links differ in various properties such as packet processing scheme, radio channel scheduling scheme, and base station parameters, and their bandwidths and delay times also vary frequently according to a user's location and the congestion situation. Particularly in the case of a link of the 5G standard under development, loss of line-of-sight (LOS) that is caused by a vehicle passing by or change of terminal's location may cause an abrupt drop in the data rate and, depending on the situation, result in temporary breakage of the links. Accordingly, it is necessary that, even when one of the two links becomes temporarily unavailable, the other link is maintained with a guarantee of reliable performance and, upon recovery of the out-of-use link, the bandwidth of the recovered link is used quickly. That is, even when the bandwidth varies significantly, the aggregated throughput has to quickly follow the bandwidth variation.

There is therefore a need of a packet distribution method that is capable of securing a stable and high aggregated throughput even in an environment where link state varies dynamically.

SUMMARY

The disclosure provides a packet distribution method of a device such as a gateway, a switch, and a base station in a mobile communication network.

The disclosure provides a packet distribution method that is capable of efficiently aggregating bandwidths of multiple links of a multilink-enabled arbitrary network device.

According to an embodiment of the disclosure, a transmitting device supporting a plurality of radio links in a mobile communication network is provided. The transmitting device includes a packet distributor configured to receive feedback information on a plurality of links from a receiving device and distribute packets to the plurality of links based on the feedback information, and output ports corresponding to the plurality of links and configured to transmit the distributed packets through the plurality of links.

According to another embodiment of the disclosure, a receiving device supporting a plurality of radio links in a mobile communication network is provided. The receiving device includes a link status manager configured to generate feedback information on a plurality of links and transmit the feedback information to a transmitting device, and input ports corresponding to the plurality of links and configured to receive packets transmitted based on the feedback information.

According to another embodiment of the disclosure, a method of a transmitting device supporting a plurality of radio links in a mobile communication network is provided. The method includes receiving feedback information on a plurality of links from a receiving device, distributing packets to the plurality of links based on the feedback information, and transmitting the distributed packets through the plurality of links.

According to another embodiment, a method of a receiving device supporting a plurality of radio links in a mobile communication network is provided. The method includes generating feedback information on a plurality of links, transmitting the feedback information to a transmitting device, and receiving packets transmitted based on the feedback information.

The disclosed method is advantageous in terms of aggregating bandwidths efficiently in an environment where link status varies dynamically, particularly in a 5G communication environment.

The disclosed method is also advantageous in terms of being applicable regardless of a layer and a structure.

The disclosed method is also advantageous in terms of operating independently from a higher layer protocol or application service such as a transmission control protocol (TCP), a user datagram protocol (UDP), and a real-time transport protocol (RTP).

The disclosed method is also advantageous in terms of allowing an aggregated throughput quickly following a change of links in an environment where states of links and available bandwidth vary continuously.

DETAILED DESCRIPTION

Although preferred embodiments are described herein with reference to accompanying drawings, the disclosed embodiments may be subjected to various modifications. The disclosed embodiments are not intended to limit the scope of the claims, and it should be understood that the embodiments include all changes, equivalents, and substitutes within the sprit and scope of the disclosure. Detailed descriptions of well-known functions and structures incorporated herein may be omitted to avoid obscuring the subject matter of the disclosure.

In the specification, terms such as "first" and "second" are used herein to arbitrarily distinguish between the elements such terms describe and are not intended to indicate or imply relative importance or significance. Such terms should be used only for the purpose of distinguishing one element from another.

The terminology used herein is for the purpose of describing particular embodiments only and is not intended to be limiting of the disclosure. As used herein, singular forms are intended to include the plural forms as well, unless the context clearly indicates otherwise. It will be understood that the terms "comprises" and/or "has" when used in this specification, specify the presence of stated feature, number, step, operation, component, element, or a combination thereof, but they do not preclude the presence or addition of one or more other features, numbers, steps, operations, components, elements, or combinations thereof.

In the disclosed embodiments, a module or a unit carries out at least one function or operation and may be implemented in hardware or software or as a combination of hardware and software. Also, a plurality of modules or units may be integrated into one module in the form of at least one processor (not shown) with the exception of the module or unit that should be implemented with specific hardware.

As a representative bandwidth aggregation enabler protocol, there is a multipath transmission control protocol (MPTCP) standardized by the Internet Engineering Task Force (IETF). The MPTCP is basically an extended version of transmission control protocol (TCP).

Figure 1:
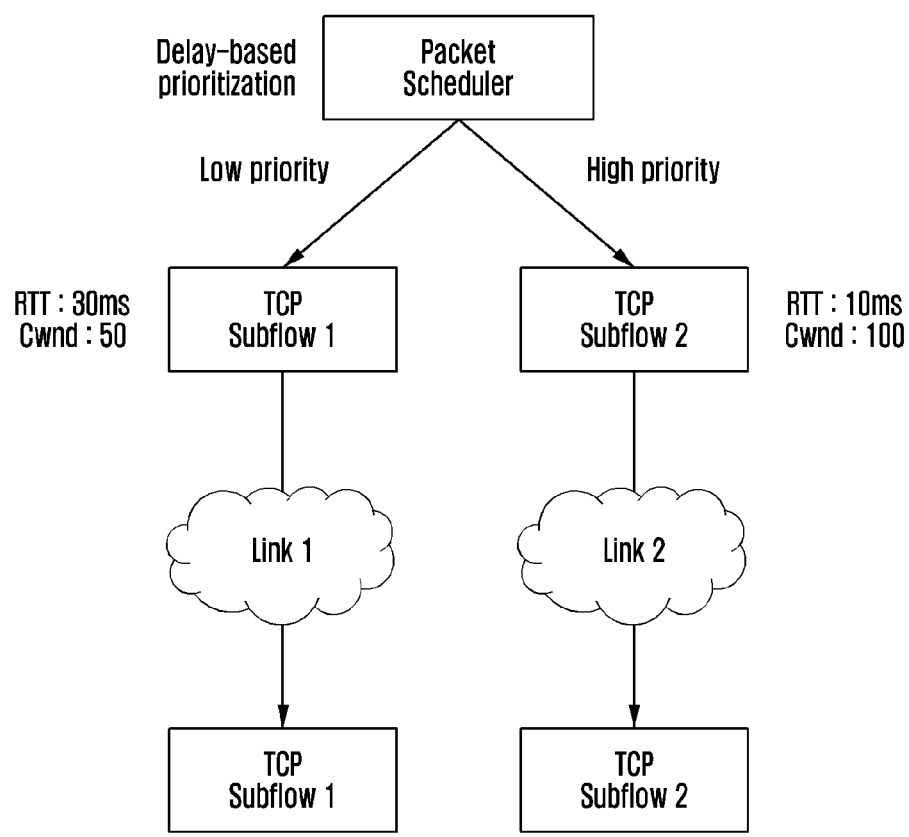
FIG. 1 is a diagram illustrating an MPTCP-based packet distribution method.

FIG. 1 is a diagram illustrating an MPTCP-based packet distribution method.

In the MPTCP supporting multiple TCP sub-flows, packet distribution is performed in such a way that a sub-flow with the least round trip time (RTT) is prioritized. If a congestion window (CWND) of the corresponding sub-flow is full such that no more packets can be transmitted therein, a sub-flow with the next least RTT is selected.

In detail, the MPTCP opens an independent TCP sub-flow per path (i.e., link). A packet scheduler determines a sub-flow for transmitting a packet based on link information (e.g., RTT) collected per the TCP sub-flow. A less-delay first policy is applied in a default packet scheduling method for MPTCP reference codes. The less-delay first policy means the link with the highest speed is preferentially used among multiple links. That is, a TCP sub-flow with the least RRT is preferentially selected for assigning a packet thereto and, if the CWND becomes full such that no more packets can be transmitted therein, another TCP sub-flow with the next lest RRT is selected. It may also be possible to use a round-robin policy or a policy of copying the same packet onto all links for transmission.

In reference to FIG. 1, there is TCP sub-flow 1 with an RTT of 30 ms and TCP sub-flow 2 with an RTT of 10 ms. According to the less-delay first policy, i.e., a policy of prioritizing sub-flows for packet distribution based on delay, the TCP sub-flow 2 is prioritized over the TCP sub-flow 1 because the RRT of the TCP sub-flow 2 is less than the RRT of the TCP sub-flow 1. Accordingly, at first packets are transmitted through the TCP sub-flow 2 (i.e., link 2). Afterward, if the CWND of the TCP sub-flow 2 becomes full (e.g., CWND is 100), packets are transmitted through the TCP sub-flow 1 (i.e., link 1).

In the case where packet distribution is performed at a TCP endpoint as in MPTCP, the TCP sub-flows are independently used for transmission/reception, which is advantageous in that, even when a problem arises on a sub-flow, other sub-flows operate normally. Furthermore, because TCP sub-flow information (e.g., RTT, CWND, and receive buffer size) can be collected without any separate path probing processes, it is possible to secure a sufficient amount of information for use in packet distribution.

However, the MPTCP-based packet distribution is applicable only at a TCP endpoint, and it cannot be applied to an intermediate network entity such as a router, a switch, and a gateway. In order for an intermediate network entity to take charge of distributing packets, the packet distribution should be performed in a lower layer such as the Internet Protocol (IP) layer below the TCP layer. In the case where a lower layer distributes packets, it is necessary to determine information to be collected for use in packet distribution because no link information is provided separately. Given that the intermediate network entity distributes TCP traffic by packet within a TCP session rather than independent TCP session per session, if a link experiences excessive delay or is broken, this causes significant impact to the total throughput. Because an intermediate network entity, unlike an endpoint server, cannot easily collect end-to-end path information, it is difficult to apply the MPTCP packet scheduling that is performed based on various kinds of legacy TCP information, and it is necessary to reduce overhead in collecting information by minimizing information demanded for packet distribution.

In order to solve the above problems, the disclosure provides a packet distribution method that is capable of allowing an arbitrary network entity supporting multiple links to efficiently aggregate bandwidths of the multiple links. The packet distribution method is characterized by collecting and measuring state information of multiple links and determining a packet distribution scheme, and performing packet distribution through feedback message exchange. Unlike conventional methods that are applicable in a layer-specific manner (e.g., MPTCP-TCP layer, multipath routing-IP layer, and dual connectivity-packet data convergence protocol (PDCP) layer) or in a structure-specific manner (e.g., MPTCP-proxy structure and dual connectivity-non-standalone (NSA) structure), the proposed method is applicable regardless of layer and structure. The proposed method may also operate transparently to a higher layer protocol such as TCP, UDP, and RTP or an application service. The proposed method is capable of allowing the aggregated throughput to quickly follow change of a link in an environment where the link status and available bandwidth are changing continuously.

Figure 2:
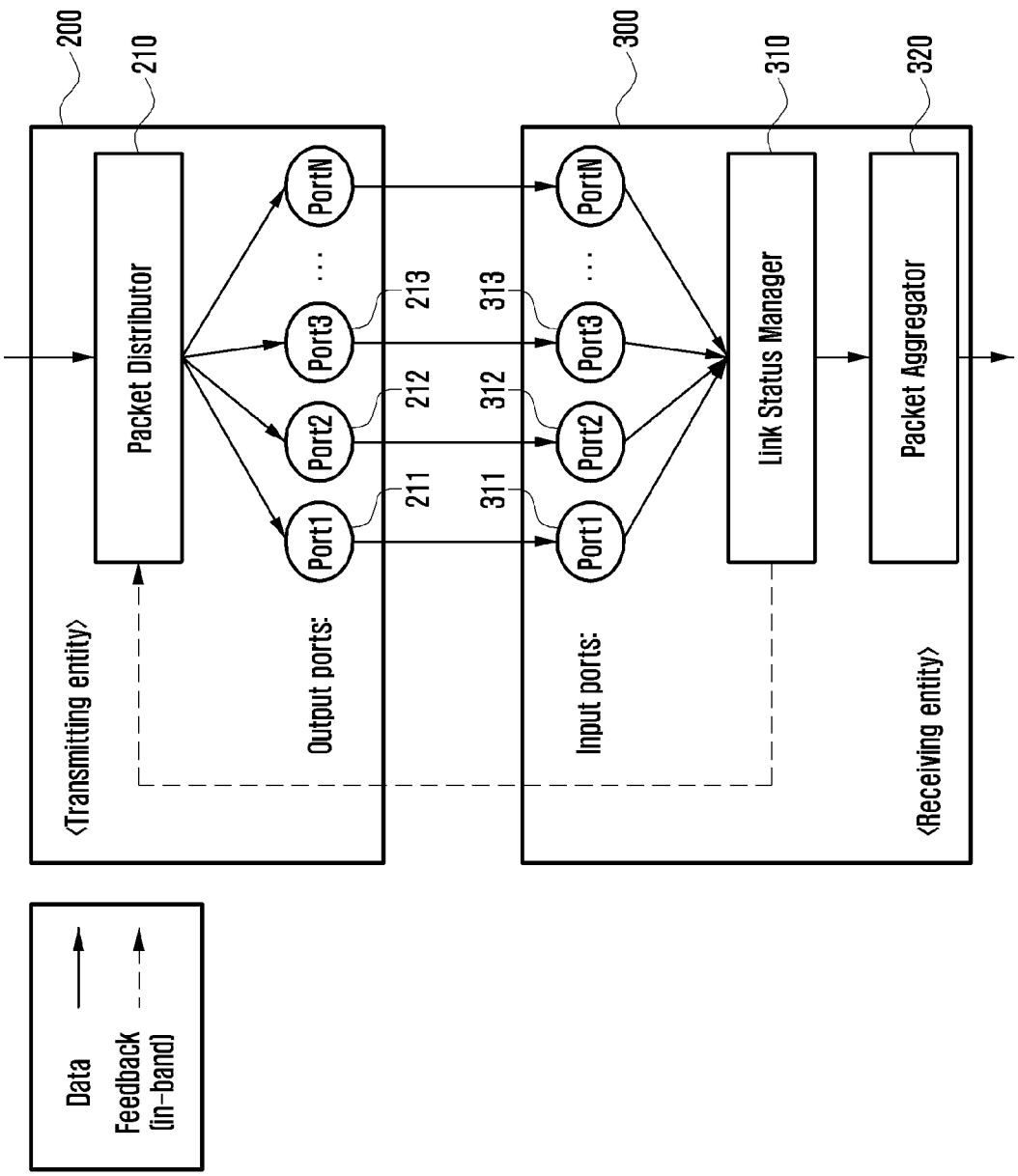
FIG. 2 is a diagram illustrating configurations of a transmitting entity and a receiving entity according to an embodiment of the disclosure.

FIG. 2 is a diagram illustrating configurations of a transmitting entity and a receiving entity according to an embodiment of the disclosure.

A transmitting device (not shown) may establish a transmit entity 200 per receiver (not shown) in communication with the transmitting device. For example, if the transmitting device is a gateway inside a mobile communication network and the receiving device is a mobile terminal, the transmitting device may establish a transmitting entity 200 per mobile terminal. The transmitting entity 200 may include a packet distributor 210 and output ports 211, 212, 213, . . . that are functionally connected to the packet distributor 210. For example, the output port 1 211 may be configured for use of a 4G communication technology, the output port 2 212 may be configured for use of a 5G communication technology, and the output port 3 213 may be configured for use of a Wi-Fi radio technology.

The receiving entity 300 may include input ports 311, 312, 313, . . . for receiving data from the output ports 211, 212, 213, . . . , a link state manager 310 that is functionally connected to the input ports 211, 212, 213, . . . , and a packet aggregator 320. The link status manager 310 and the packet aggregator 320 may be implemented in the same device or separate devices. For example, the packet aggregator 320 may be included in a terminal, and the link status manager 310 may be included in a base station or in a separate device.

In the following description, it is assumed that all packets have unique sequence numbers. A sequence number of the TCP or PDCP layer may be reused or newly assigned per packet according to a packet distribution layer, a service, and a situation.

Basically, the transmitting entity 200 and the receiving entity 300 operate in a corresponding manner. Descriptions are made of the functions of the components depicted in FIG. 2 hereinafter.

The packet distributor 210 of the transmitting entity 200 is configured to update per-link weights and internal state information based on per-link feedback information received from the link status manager 310 of the receiving entity 300 and distribute packets to the output ports 211, 212, 213, . . . corresponding to the respective links. Although not shown in FIG. 2, the packet distributor 210 may include a component for receiving the feedback information The link status manager 310 of the receiving entity 300 measures and collects various kinds of link information such as estimated link rate, delay, and radio channel status and transmits the link information to the packet distributor 210 of the transmitting entity 200 periodically or aperiodically based on the link status. Upon detecting a change in a link, the link status manager 310 may transmit a mode transition message to the packet distributor 210. Although not shown in FIG. 2, the link status manager 310 may include a component for transmitting the feedback information, i.e., link information and/or mode transition message.

The packet aggregator 320 of the receiving entity may reorder the out-of-order packets incoming through multiple links based on the sequence numbers and deliver the reordered packets to an upper layer or a next node.

Detailed descriptions of the link weight calculation, internal state update, and reordering are made later.

In a disclosed embodiment, three transmission modes are defined as follows: 1) splitting mode for distributing packets based on weights calculated for all available links, 2) duplicating mode for copying the same packets into all links, and 3) pre-splitting mode for distributing packets to a specific link temporarily.

Descriptions are made hereinafter of the operation methods in the transmission modes. In the splitting mode, the packet distributor 210 performs bandwidth aggregation based on the link information being received from the link status manager 310. That is, the packet distributor 210 distributes the packets based on the weights calculated for all available links. In the splitting mode, if the packet distributor 210 detects a problem on a link that causes a data rate to drop significantly or causes transmission failure, it may immediately switch the transmission mode to the duplicating mode. In the duplicating mode, it is possible to guarantee at least a performance expected with the data rate on the links that are still operating normally because the same packets are transmitted on all the links. If the problem is resolved such that the data rate of the corresponding link is recovered, the transmission mode may be switched backed to the splitting mode.

Even though the transmission mode is switched back to the splitting mode, transmission pipes of the links that are operating normally for transmission in the duplicating mode are likely to be full. For this reason, if a normal packet distribution is performed for the links that have been normally transmitting packets and the link recovers immediately, this may lead to performance degradation. Let's suppose that a link 1 and link 2 are operating in the splitting mode and transmission on link 2, which has a bandwidth much broader and faster than that of link 1, is temporarily broken. The transmission mode may be switched to the duplicating mode, and the TCP transmission amount may become fit for the speed of link 1. Afterward, if link 2 is recovered such that the transmission mode is switched back to the splitting mode, per-link information is collected in a situation where the full bandwidth is in use for link 1 while a transmission pipe of link 2 is not filled fully. Accordingly, although link 2 has been recovered already, the speed of link 2 is still underestimated such that link 2 is assigned a low weight for packet distribution. Meanwhile, the data being transmitted through link 2, which is not filled fully, is likely to arrive relatively early at the receiving device and thus be held in a reordering buffer of the receiving device. As a consequence, transmission of an acknowledgement (ACK) corresponding to the data transmitted through link 2 is delayed, which causes continuous underflow on the link and results in an increase in the probability of failure of immediate TCP transmission amount recovery.

Meanwhile, an abrupt increase of link bandwidth in the split mode is likely to cause a problem. In a 5G communication environment, it may occur that the communication environment changes from a non-LOS situation to an LOS situation, for example when a truck is passing by. In this case, it may take a long time to fill the increased bandwidth using the conventional technology.

In order to solve the above problems, the pre-splitting mode is defined for the proposed method. That is, if a peak bandwidth is equal to or greater than a predetermined threshold before transitioning from the duplicating mode to the splitting mode or during the splitting mode, the transmission mode may be temporarily set to the pre-splitting mode. In the pre-splitting mode, a link that is estimated as being underutilized, among the links available for transmission, is set as a target link such that packets are distributed only to the target link. During the pre-splitting mode, information update of the links except for the target link is suspended, and the link information updated before entering the pre-splitting mode is maintained. Afterward, if the transmission mode transitions from the pre-splitting mode to the splitting mode, the packet distribution is performed based on the link information of the target link that has been updated and the link information of other links that has been maintained during the pre-splitting mode. This makes it possible to perform the packet distribution with the weights calculated in the state where the bandwidths of all of the links are sufficiently filled.

Figure 3:
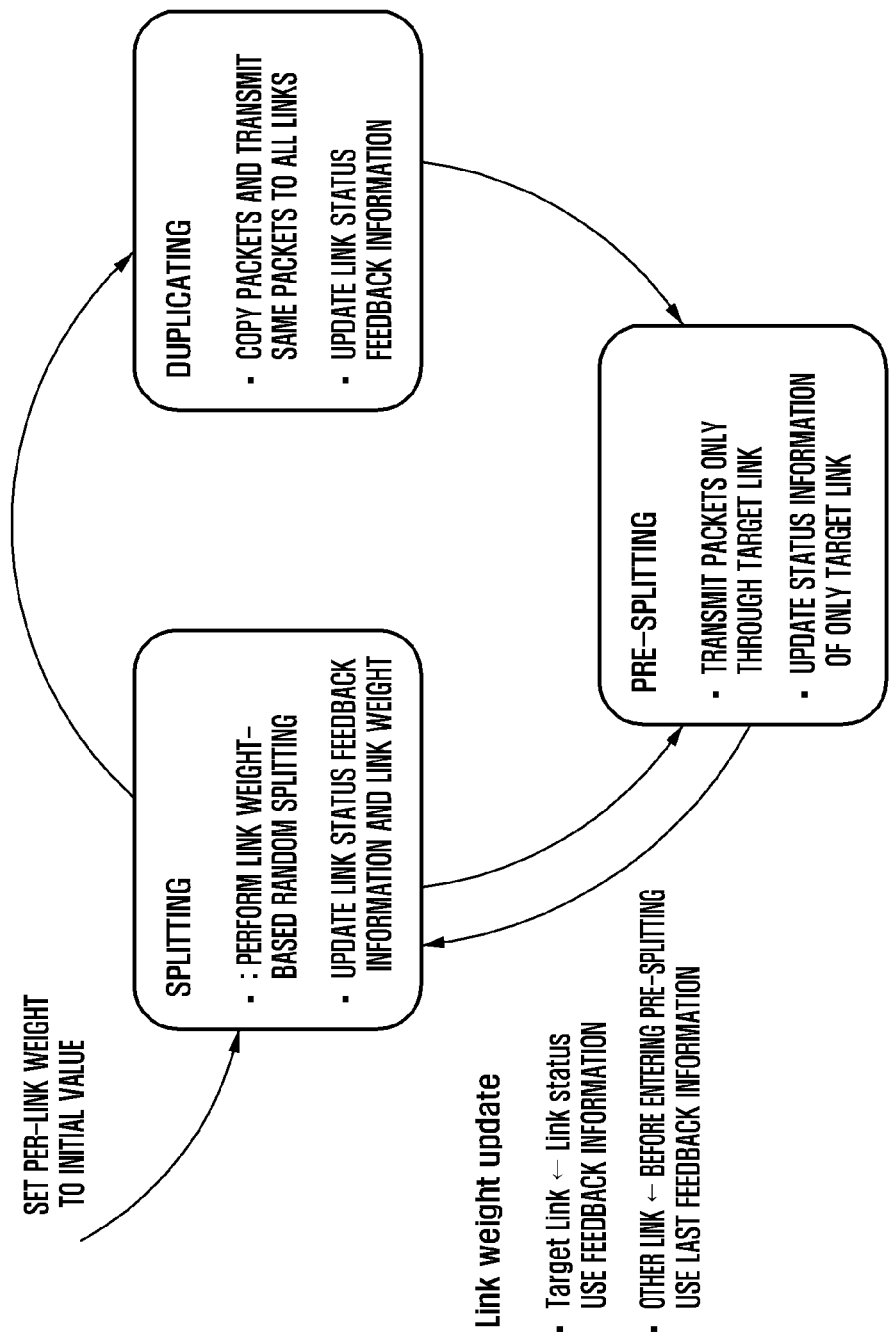
FIG. 3 is a diagram illustrating a transmission mode transition and operation method of a packet distributor.
Figure 4:
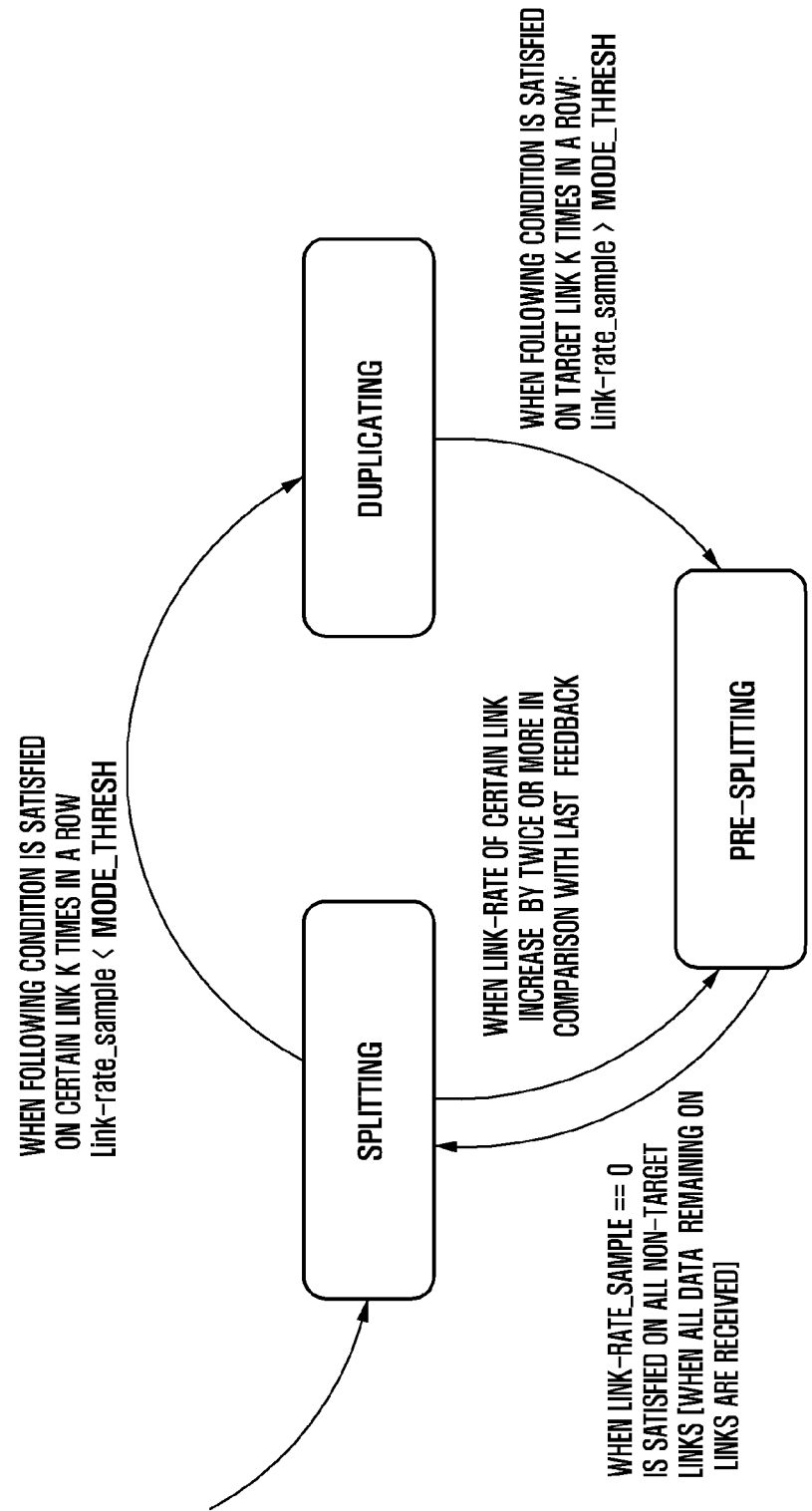
FIG. 4 is a diagram illustrating transmission mode transitions of a link status manager.
Figure 5:
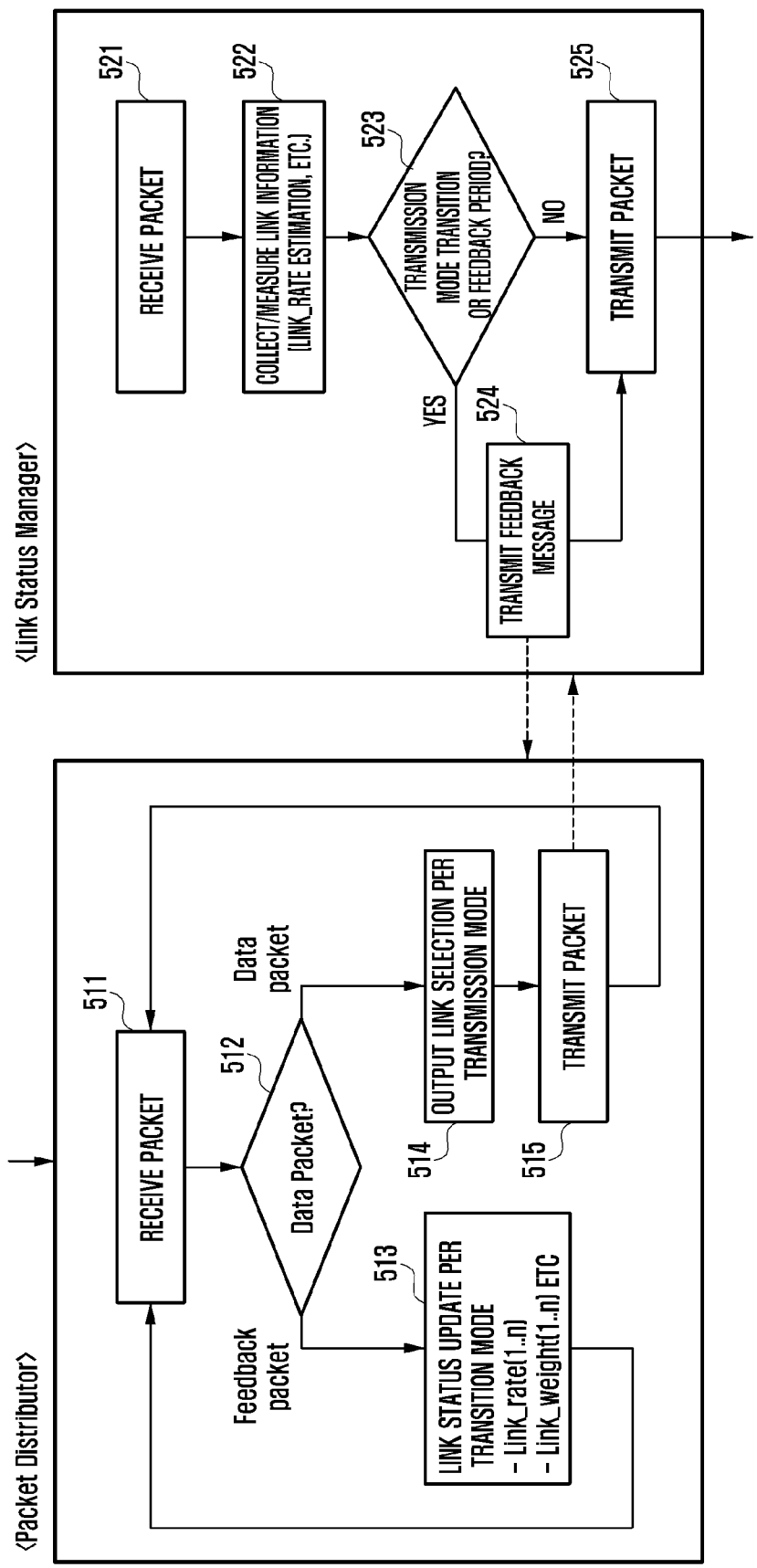
FIG. 5 is a flowchart illustrating an operation of exchanging data between a packet distributor and a link status manager.

Descriptions are made of the detailed operations of the individual components in the above-described transmission modes with reference to FIGS. 3 to 5.

FIG. 3 is a diagram illustrating a transmission mode transition and operation method of the packet distributor 210.

The packet distributor 210 performs packet distribution in one of the aforementioned three transmission modes (splitting mode, duplicating mode, and pre-splitting mode). If data transmission is triggered, the packet distributor 210 starts distributing packets in the splitting mode. In the splitting mode, a weight random splitting operation is performed based on weights of links. For example, assuming that packet distribution is performed to two links, i.e., link 1 with a link weight of 0.7 and link 2 with a link weight of 0.3, each packet may be distributed to link 1 with a probability of 70% and link 2 with a probability of 30%. At the initial stage of the transmission, initial values are assigned to the respective links because there is no collected information on the links.

The link weights may be calculated by Equation 1 based on per-link estimated link rates received from the link status manager 310.

$$\text{Weight}\_i = \text{Link-rate}\_i / \text{SUM}(\text{Link-rate}\_i) \quad \text{Equation 1}$$

Here, Weight_i denotes a weight of the $i^{th}$ link, and Link-rate_i denotes an estimated link rate of the $i^{th}$ link. The weights of links may be updated upon receipt of a link status feedback from the link status manager 310. If a newly calculated Weight_i is greater than the old value, a check is made to determine whether the Link-rate_i is increased to update the Weight_i only if the Link-rate_i is actually increased.

If the feedback from the link status manager 210 is indicative of transmission mode transition or if the transmitting entity 200 makes a determination of transmission mode transition, the transmission mode may transition from the splitting mode to the duplicating mode or the pre-splitting mode.

In the duplicating mode, it is not necessary to update per-link weights because the same packet is copied to all of the links. However, the link rates are always updated with the new values obtained from the link status feedback.

In the pre-splitting mode, a target link number may be received from the link state manager 210 (along with the mode transition request). In the pre-splitting mode, a packet is distributed to only a target link, only the link rate of the target link is updated, and the link rate of the other link is maintained so as to be identical with that before entering the pre-splitting mode (i.e., in the splitting mode or duplicating mode). After transitioning from the pre-splitting mode to the splitting mode, the information updated in the pre-splitting mode in association with the target link and the information used before entering the pre-splitting mode in association with the other link may be used in calculating the link rate in the splitting mode.

By introducing the pre-splitting mode, it is possible to apply the weights based on the information when all of the links were sufficiently used. After entering the splitting mode, the link rate update is performed per link based on the per-link status feedback, and the per-link weights are calculated based on a result of the link rate update.

The link status manager 310 collects status information per link. The link status manager 310 may make a determination of a transmission mode based on the per-link status information or transmit feedback information for use by the transmitting entity 200 in determining a transmission mode. The link status manager 310 also calculates a link rate based on incoming data packets per link. The link status manager 310 takes link rate samples during every predetermined period or from every predetermined data amount and performs a moving average based thereon to calculate an approximate average value of the link rate. For example, if a number of received data packets accumulated from a time point after elapse of 1 ms is equal to or greater than a predetermined value (e.g., equal to or greater than 10) or if a predetermined time period elapses (e.g., 10 ms elapse), the Link-rate_sample value may be calculated as Equation 2.

$$\text{Link-rate\_sample} = \text{Received\_data\_packet\_size (bytes)} * 8/\Delta t \quad \text{Equation 2}$$

The calculated Link-rate_sample may be filtered using Equation 3.

$$\text{Link-rate} = \text{Link-rate} * \alpha + \text{Link-rate\_sample} * (1-\alpha) \quad \text{Equation 3}$$

Here, $\alpha$ may be set to 7/8. The per-link information such as the link rate measured in this manner may be periodically transmitted to the packet distributor 210. For example, this information may be transmitted at an interval of 100 ms. The per-link information may also be transmitted to the packet distributor 210 aperiodically.

If a speed problem is detected on a certain link during link status monitoring or reporting, transmission mode transition may occur. FIG. 4 is a diagram illustrating transmission mode transitions of a link status manager. Although FIG. 4 is directed to the case where the link status manager of the receiving entity makes a determination of a transmission mode, the link status manager may also be configured to transmit information to the transmitting entity in order for the transmitting entity to make a determination of a transmission mode based on the information.

In reference to FIG. 4, if a data rate of a link, i.e., link rate, decreases to a predetermined level (MODE_THRESH), e.g., 1 Mbps, the link status manager determines that there is a problem on the corresponding link, designates the corresponding link as a target link, and makes a determination of transmission mode transition to the duplicating mode. Afterward, if the data rate of the target link recovers to be equal to or greater than the predetermined level, the link status manager may make a determination of transmission mode transition to the splitting mode via the pre-splitting mode.

As described above, the pre-splitting mode is an intermediate transmission mode for filling the pipe of the target link sufficiently; if the data transmitted on the other link arrives at the receiving side (i.e., Link-rate_sample value becomes 0), the link status manager makes a determination of transmission mode transition to the splitting mode. In order to quickly cope with an abrupt increase of bandwidth during the splitting mode, the link status manager may make a determination of a transmission mode switching from the splitting mode to the pre-splitting mode. That is, if the link rate of a certain link increases by a predetermined amount or more (e.g., equal to or greater than double) in comparison with that indicated by the last feedback, the link state manager may designate the corresponding link as a target link and transitions from the splitting mode to the pre-splitting mode.

After making the transmission mode transition determination, the link status manager transmits a transmission mode transition message to the packet distributor, which transitions to a transmission mode as indicated by the message.

FIG. 5 is a flowchart illustrating an operation of exchanging data between a packet distributor and a link status manager.

If a packet is received at step 511, the packet distributor determines at step 512 whether the packet is a feedback packet received from the link status manager or a data packet. If it is determined that the received packet is a feedback packet, the packet distributor updates, at step 513, a link status such as a link rate and a link weight based on feedback information included in the feedback packet. If it is determined that the arrived packet is a data packet, the packet distributor performs packet distribution for bandwidth aggregation. That is, at step 514, the packet distributor selects an output link(s) and distributes packets to the selected output link(s) according to the transmission mode at step 514, and transmits the data packet to the receiving device through an output port(s) at step 515.

The link status manager performs measurement with the received data packet to acquire link information. That is, the link status manager receives the data packet from the transmitting device at step 521 and collects and measures link information such as link rate estimation at step 522. The link status manager also determines, at step 523, whether a transmission mode transition is necessary or a feedback period arrives based on the measured and collected information and, on the basis of a result of the determination, transmits a feedback message to the packet distributor at step 524 or sends the data packet, at step 525, to a next node or, if the link status manager operates in a terminal, a packet aggregator.

In the splitting mode and pre-splitting mode, the packet aggregator performs reordering before transmitting the data to a TCP endpoint of the receiving side. The packet aggregator maintains a variable next_seq internally for reordering. The variable next_seq means a next in-order sequence number. If a packet arrives at the packet aggregator, the packet aggregator compares the sequence number packet_seq of the packet with the next_seq. If the packet_seq is greater than the next_seq, this means that the packet is an out-of-order packet, and the corresponding packet is input to a reordering queue. However, if the sequences are duplicates, the corresponding packet is dropped. If the packet_seq is identical with the nex_seq, this means that the corresponding packet is an in-order packet, and all in-order packets including the corresponding packet that are queued in the reordering queue are flushed out. Next, the next_seq value is updated with packet_seq+data_size. If the packet_seq is less than the next_seq, this means that the packet is an old one, and the packet is just passed through.

If the transmission mode transition is made to the duplicating mode, reordering is not performed. All packets remained in the reordering queue before the transmission mode transition are flushed out. If a predetermined time period (e.g., 200 ms) elapses after the update of the first packet in the reordering queue, a timeout is issued to flush out all of the packets in the queue.

Figure 6:
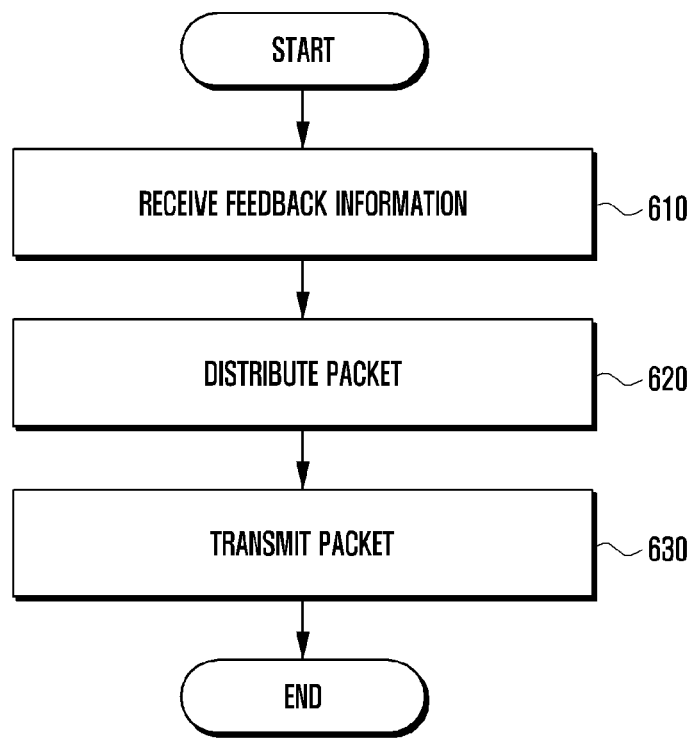
FIG. 6 is a flowchart illustrating an operation method of a transmitting device in a mobile communication network supporting multiple radio links according to an embodiment of the disclosure.

FIG. 6 is a flowchart illustrating an operation method of a transmitting device in a mobile communication network supporting multiple radio links according to an embodiment of the disclosure.

In reference to FIG. 6, a packet distributor of a transmitting entity receives feedback information on multiple links from a receiving device at step 610. As described above, the transmitting entity may be implemented, in a transmitting device such as a gateway, per receiving entity. The feedback information may include link status information such as link rate, signal strength, and buffer drain rate. The feedback information may also include a transmission mode determined by the received entity based on such information.

At step 620, the packet distributor of the transmitting entity distributes packets to the multiple links based on the received feedback information. The packet distributor may distribute the packets in a transmission mode. As described above, the transmission mode may include at least one of multiple transmission modes including a splitting mode for distributing different packets to multiple links based on weight which is determined based on the feedback information, a duplicating mode for distributing the same packets to multiple links, and a pre-splitting mode for distributing packets to a specific link among multiple links.

If the feedback information includes transmission mode, the packet distributor distributes the packets in the transmission mode indicated in the feedback information. Alternatively, the packet distributor may make a determination of a transmission mode based on the feedback information. For example, as described with reference to FIGS. 3 and 4, in the case where the transmitting device is currently operating in the duplicating mode, if the feedback information indicates that the data rate of one of multiple links is equal to or greater than a predetermined threshold value, the packet distributor may make a determination of transmission mode transition to the pre-splitting mode. In the case where the transmitting device is currently operating in the splitting mode, if the feedback information indicates that the data rate of one of multiple links has increased by a predetermined multiple or more, the packet distributor may make a determination of transmission mode transition to the pre-splitting mode. In the case where the transmitting device is currently operating in the pre-splitting mode, if the feedback information indicates that the data rate of a non-target link drops to become equal to or less than a predetermined value (e.g., 0), the packet distributor may make a determination of transmission mode transition to the splitting mode.

At step 630, the output ports of the transmitting entity transmit the distributed packets through the corresponding links.

Figure 7:
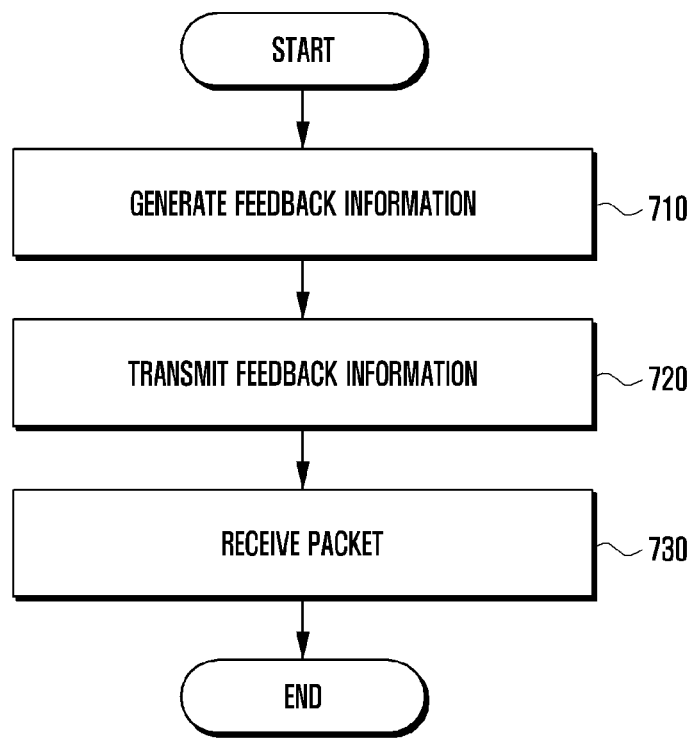
FIG. 7 is a flowchart illustrating an operation method of a receiving device in a mobile communication network supporting multiple radio links according an embodiment of the disclosure.

FIG. 7 is a flowchart illustrating an operation method of a receiving device in a mobile communication network supporting multiple radio links according an embodiment of the disclosure.

In reference to FIG. 7, a link status manager of a receiving entity collects and measures status information on multiple links to generate feedback information at step 710. As described above, the link status manager of the receiving entity may be implemented along with a packet aggregator in a mobile terminal. The link status manager may be implemented in a base station while the packet aggregator is implemented in the mobile terminal. The feedback information may include link status information such as link rate, signal strength, and buffer drain rate. In the case where the receiving entity makes a determination of the transmission mode of a transmitting entity, the feedback information may include transmission mode.

If the feedback information includes transmission mode for a transmission device to distribute packets to multiple links, the link status manager may make a determination of the transmission mode based on the status information on the multiple links. As described above, the transmission mode may include at least one of a splitting mode for distributing different packets to multiple links based on weight which is determined based on the feedback information, a duplicating mode for distributing the same packets to multiple links, and a pre-splitting mode for distributing packets to a specific link among multiple links. For example, as described with reference to FIGS. 3 and 4, in the case where the transmitting device is currently operating in the duplicating mode, if the feedback information indicates that the data rate of one of multiple links is equal to or greater than a predetermined threshold value, the link status manager may make a determination of transmission mode transition of the transmitting device to the pre-splitting mode. In the case where the transmitting device is currently operating in the splitting mode, if the feedback information indicates that the data rate of one of multiple links has increased by a predetermined multiple or more, the link status manager may make a determination of transmission mode transition of the transmitting device to the pre-splitting mode. In the case where the transmitting device is currently operating in the pre-splitting mode, if the feedback information indicates that the data rate of a non-target link drops to become equal to or less than a predetermined value (e.g., 0), the link status manager may make a determination of transmission mode transition of the transmitting device to the splitting mode.

The link status manager transmits, at step 720, the generated feedback information to the transmitting entity and receives, at step 730, packets that the transmitting entity transmits based on the feedback information.

The disclosed embodiments can be applied in various communication environments, especially when an LTE link and a 5G link are aggregated in a mobile communication network. Although standardization of architecture for interworking between LTE and 5G is not finalized yet, it may be possible to consider a standalone-based 4G-5G interworking architecture and a non-standalone-based interworking architecture.

Figure 8:
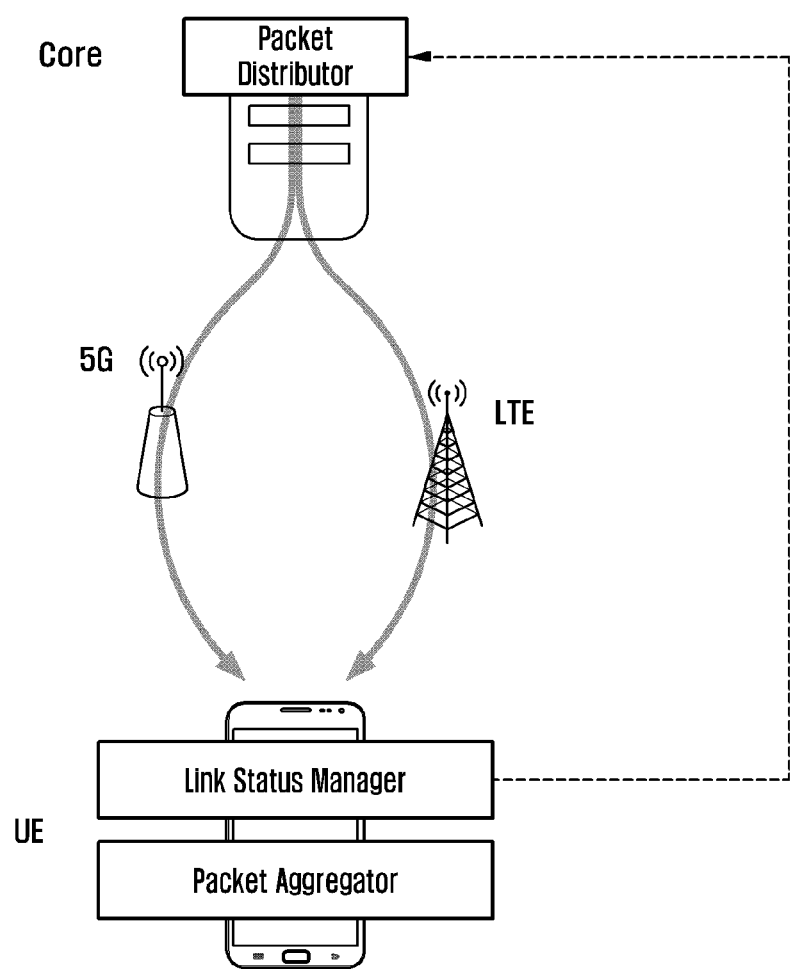
FIGS. 8 to 10 are diagrams illustrating standalone-based 4G-5G interworking and non-standalone-based interworking architectures to which the proposed method is applied.
Figure 9:
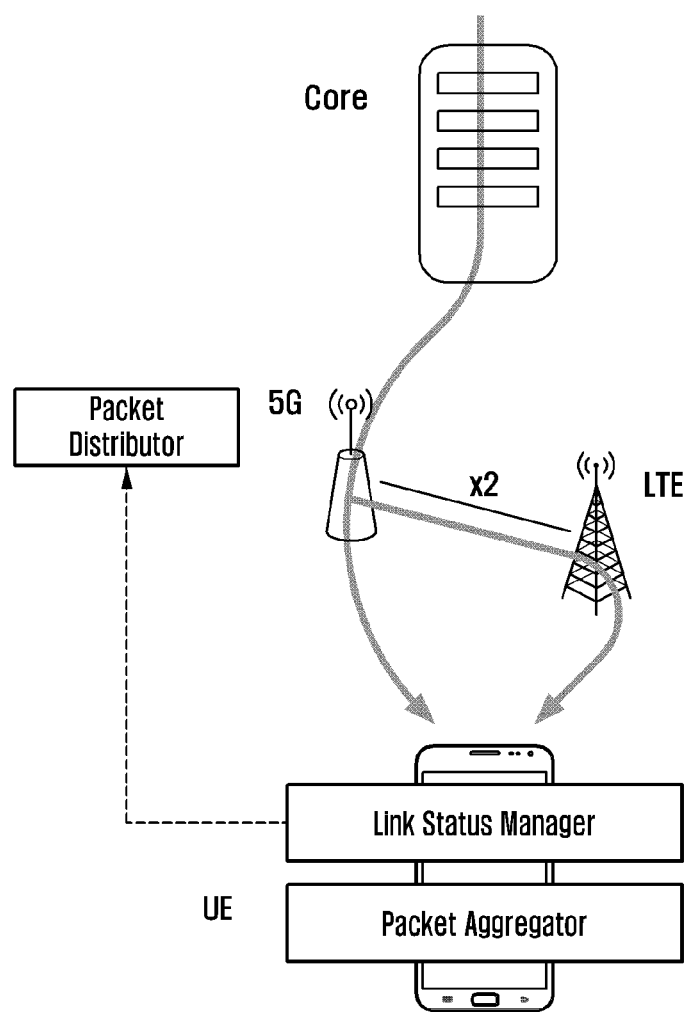
Figure 10:
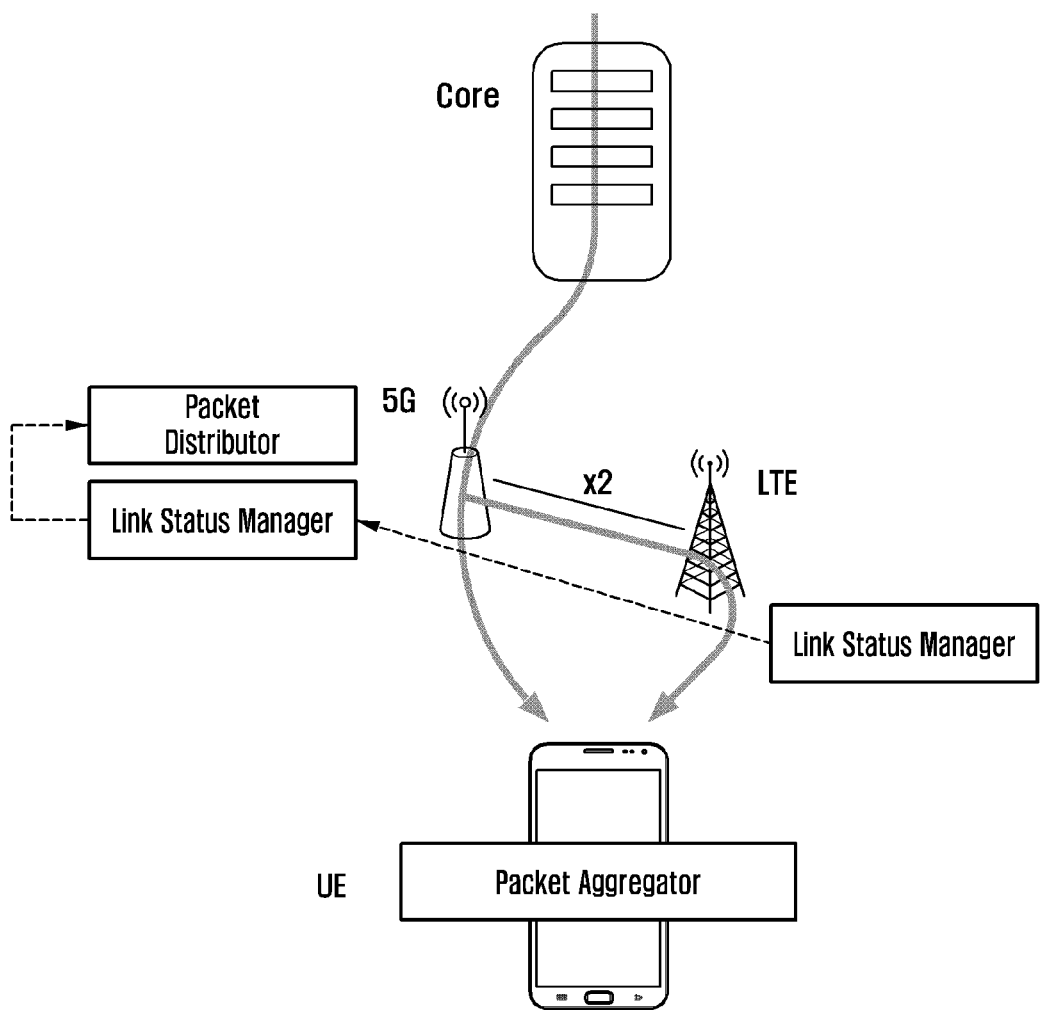

FIGS. 8 to 10 are diagrams illustrating standalone-based 4G-5G interworking and non-standalone-based interworking architectures to which the proposed method is applied.

In the case of the standalone-based architecture, a packet distributor may be implemented at a gateway of a core network, and a link state manager and a packet aggregator may be implemented in a terminal. That is, the terminal may collect link information and transmit the link information to the packet manager of the gateway. In a disclosed embodiment, the components responsible for uplink traffic may be disposed in a symmetrical manner.

FIGS. 9 and 10 show how the proposed method is applicable to a dual connectivity situation in a non-standalone-based interworking architecture under discussion in the 5G standardization organization. The link status manager in charge of collecting and transmitting link information may be implemented at the terminal as shown in FIG. 9 in the same manner as shown in FIG. 8 or at base stations in a distributed manner as shown in FIG. 10. In the case where the link information is received from the base stations, it may be possible to use buffer drain-rates of the base stations instead of estimated link rates. For example, instead of the link-rate_sample of Equation 2, a buffer-drain-rate_sample may be derived by Equation 4.

$$\text{Buffer-drain-rate\_sample} = \text{Drained\_data\_size (bytes)} * 8/\Delta t \quad \text{Equation 4}$$

That is, it may be possible to estimate a bandwidth of a link by calculating how much data is drained from a buffer during a predetermined time period. Accordingly, it may be possible to designate the link state manager of the base station in which the packet distributor is implemented as a main link state manager such that the main link state manager collects information from the link status managers of other base stations and transmits feedback and transmission mode messages to the packet distributor. The packet distributor may be implemented in the PDCP and, in this case, a legacy PDCP sequence numbering/in-order delivery function may be reused or used in an extended manner.

The proposed method for quickly coping with a change of links assumes that the transmitting and receiving sides operate in a corresponding manner. In the case where the link status manager is implemented at the terminal, it is easy for a terminal vendor to detect the use of the present invention. Even from the viewpoint of a base station vendor, it is easy to detect use of the disclosed method because the link status manager function is implemented in a distributed manner in the non-standalone architecture. Because the link information and transmission mode information should be continuously exchanged for operation accuracy, it is possible to infer the use of the proposed method through packet monitoring.

Figure 11:
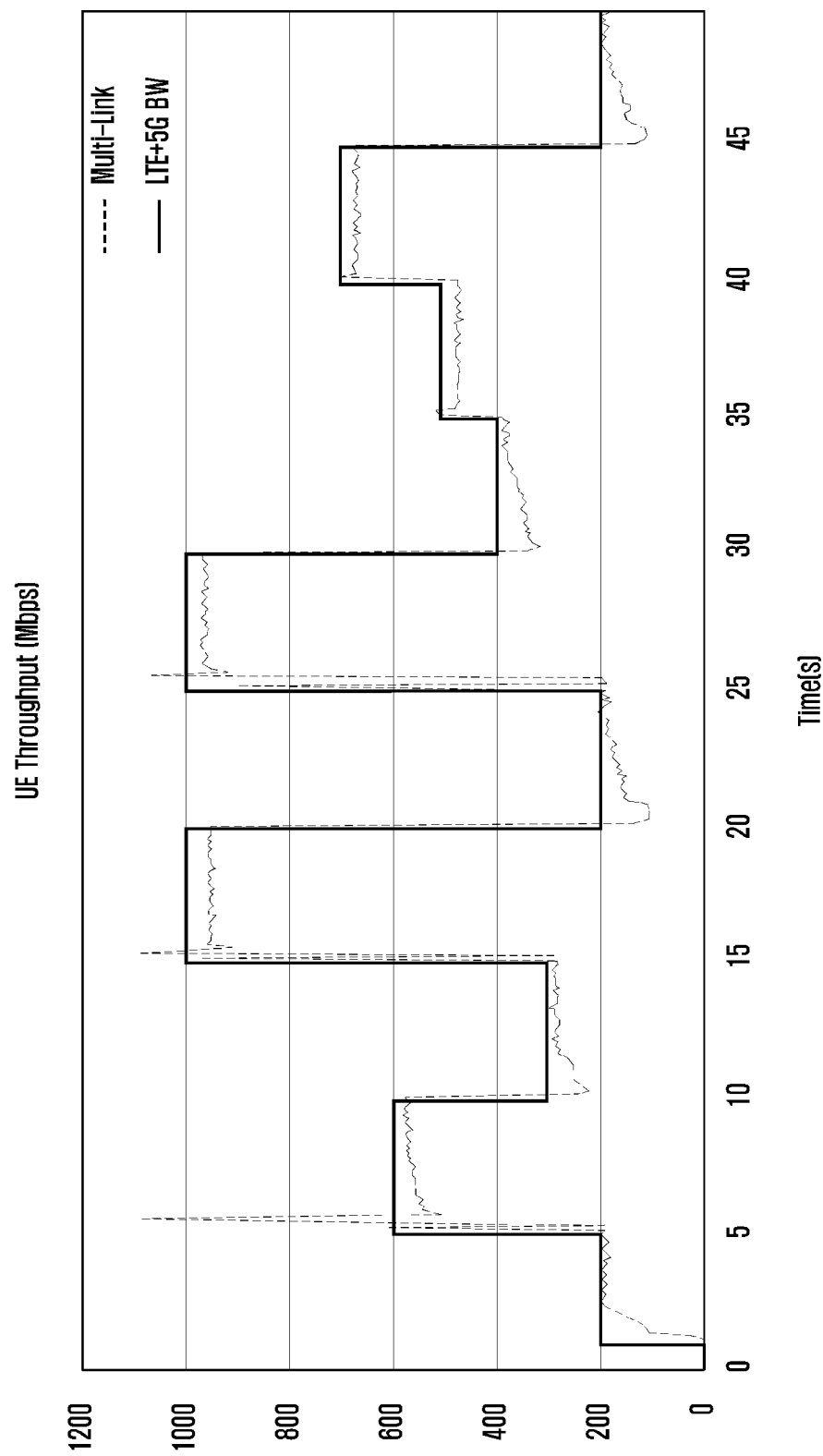
FIG. 11 is a diagram for explaining aggregation performance in a scenario where a bandwidth varies dynamically.

In order to evaluate the aggregated throughput of the proposed method, the proposed method has been simulated using an NS-3 network simulator. FIG. 11 shows aggregated throughput in a scenario where bandwidth is dynamically varying, when measuring file transfer protocol (FTP) downlink performance in a network topology where LTE and 5G links are emulated in a similar way to the links in the network environment of FIG. 8. The simulation result of FIG. 11 was obtained by measuring the aggregated throughput while changing the bandwidth of the 5G link from 100 Mbps to 900 Mbps in the state where the bandwidth of the LTE link was fixed at 100 Mbps. In FIG. 11, the dotted line denotes a sum of the bandwidths of the LTE and 5G links that was measured by changing per-link bandwidths every 5 seconds. In FIG. 11, the solid line denotes aggregated throughput that was measured at every 100 ms. From FIG. 11, it is observed that the aggregated throughput quickly follows the change of the link, even when the bandwidth varies significantly, in the case of using the proposed method.

Figure 12:
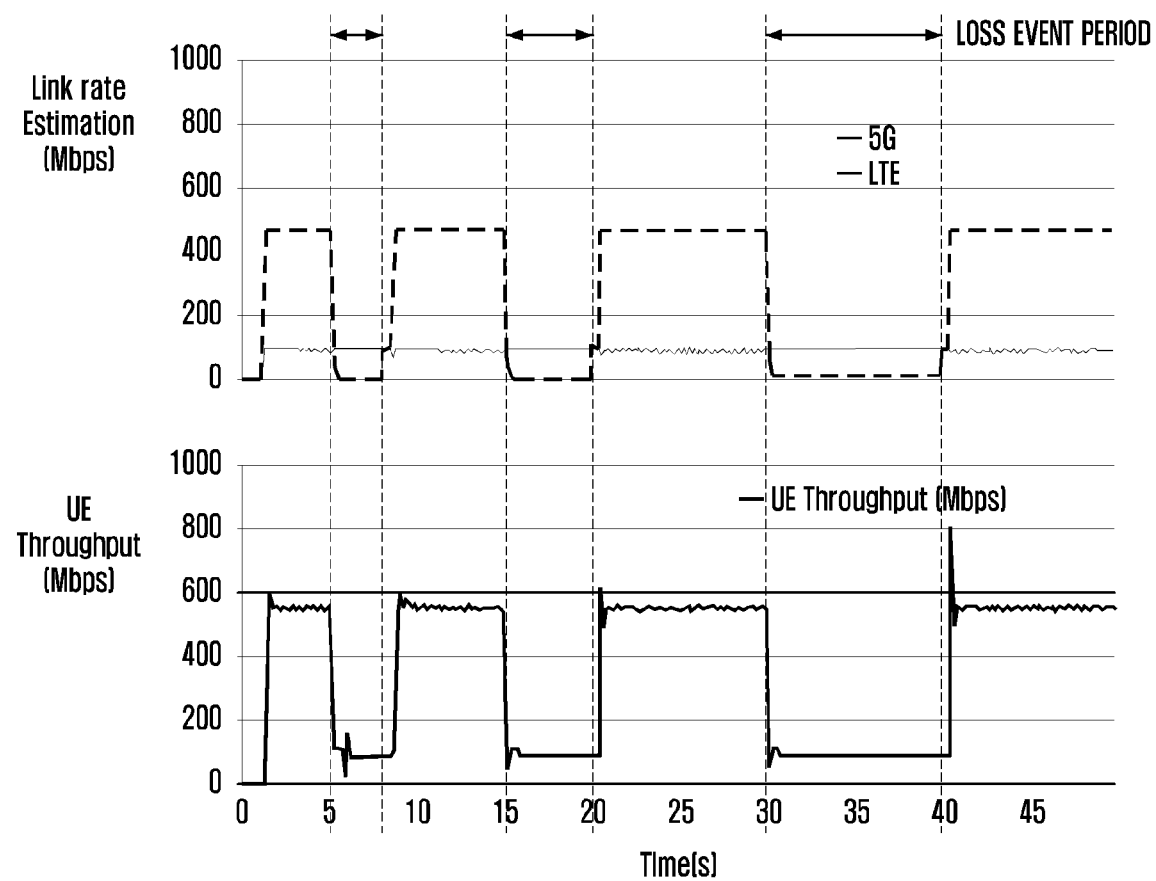
FIG. 12 is a diagram for explaining aggregation performance in a scenario where a link failure occurs aperiodically.

FIG. 12 shows aggregated throughput in a scenario where a link failure occurs aperiodically. The simulation result of FIG. 12 was obtained by measuring the aggregated throughput by emulating a link failure event with packet loss of 100% on the 5G link for between 5 to 8 seconds, between 15 to 20 seconds, and between 30 to 40 seconds in the state where the bandwidths of the LTE and 5G links were fixed to 100 Mbps and 500 Mbps, respectively. The graph in the upper part of FIG. 12 shows a link rate measured by the link status manager. It shows that the link rate on the LTE link is maintained at a level of 100 Mbps over time, while the link rate of the 5G link drops to 0 during the link failure periods. The graph in the lower part of FIG. 12 shows the aggregated throughput. The aggregated throughput of about 600 Mbps drops to a level of 100 Mbps equal to the throughput of the LTE link during the link failure periods and is quickly recovered upon resolution of the link failure on the 5G link.

Figure 13:
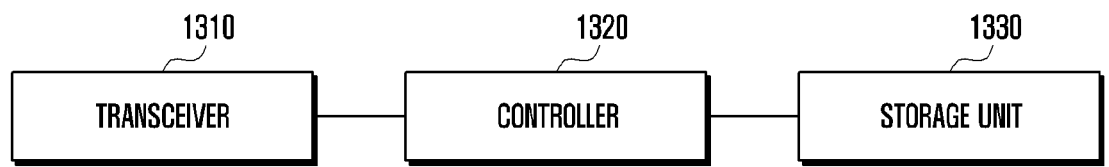
FIG. 13 is a block diagram illustrating a configuration of a transmitting device according to an embodiment of the disclosure.

FIG. 13 is a block diagram illustrating a configuration of a transmitting device according to an embodiment of the disclosure.

In reference to FIG. 13, the transmitting device may include a transceiver 1310, a controller 1320, and a storage unit 1330. In the disclosure, the controller may be defined as a circuit, an application-specific integrated circuit, or at least one processor.

The transceiver 1310 may transmit/receive signals to and from other network entities. The transceiver 1310 may receive feedback information on multiple links from a receiving device and transmit packets through the multiple links.

The controller 1320 may control overall operations of the transmitting device according to a disclosed embodiment. For example, the controller 1320 may control signal flows among the components to perform the operations described with reference to the flowcharts. In detail, the controller 1320 may control the operations of the proposed packet distributor.

The storage unit 1330 may store at least one of information transmitted/received by the transceiver 1310 and information generated by the controller 1320. For example, the storage unit 1330 may store the feedback information on the multiple links that is received from the receiving device.

Figure 14:
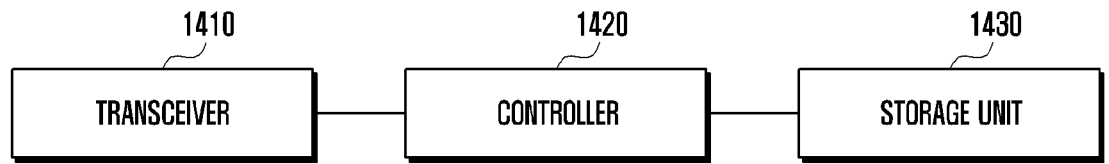
FIG. 14 is a block diagram illustrating a configuration of a receiving device according to an embodiment of the disclosure.

FIG. 14 is a block diagram illustrating a configuration of a receiving device according to an embodiment of the disclosure.

In reference to FIG. 14, the base station may include a transceiver 1410, a controller 1420, and a storage unit 1430. In the disclosure, the controller may be defined as a circuit, an application-specific integrated circuit, or at least one processor.

The transceiver 1410 may transmit/receive signals to and from another network entity. For example, the transceiver 1410 may transmit feedback information on multiple links to a transmitting device and receive packets being transmitted based on the feedback information.

The controller 1420 may control overall operations of the receiving device according to a disclosed embodiment. For example, the controller 1420 may control signal flows among the components to perform the operations described with reference to the flowcharts. In detail, the controller 1420 may control the operations of the proposed link status manager and packet aggregator.

The storage unit 1430 may store at least one of information transmitted/received by the transceiver 1410 and information generated by the controller 1420. For example, the storage unit may store the feedback information on the multiple links.

Although preferred embodiments of the disclosure have been described using specific terms, the specification and drawings are to be regarded in an illustrative rather than a restrictive sense in order to help understand the present disclosure, it is obvious to those skilled in the art that various modifications and changes can be made thereto without departing from the broader spirit and scope of the disclosure and such modifications and changes should not be understood individually from the technical spirit or prospect of the disclosure.

The invention claimed is:

1. A transmitting device supporting a plurality of radio links in a mobile communication, the transmitting device comprising:
   a transceiver configured to transmit and receive a signal; and
   a processor coupled with the transceiver and configured to:
      receive feedback information on a plurality of links from a receiving device,
      determine a transmission mode for distributing packets based on the feedback information, the feedback information including the transmission mode for distributing the packets,
      distribute packets to the plurality of links based on the feedback information,
      transmit the distributed packets through the plurality of links,
   wherein the transmission mode is one of:
      a splitting mode for distributing different packets to the plurality of links based on weight, wherein the weight is determined based on the feedback information,
      a duplicating mode for distributing the same packets to the plurality of links, and
      a pre-splitting mode for distributing packets to a specific link among the plurality of links, and
   wherein the processor is further configured to:
      transition the transmitting device operating in the duplicating mode to the pre-splitting mode, in case that the feedback information indicates that a data rate of a specific link among the plurality of links is equal to or greater than a predetermined threshold value,
transition the transmitting device operating in the splitting mode to the pre-splitting mode, in case that the feedback information indicates that the data rate of a specific link among the plurality of links increases by a predetermined multiple or more, and
transition the transmitting device operating in the pre-splitting mode to the splitting mode, in case that the feedback information indicates that data rates of other links drop to be equal to or less than a predetermined value.

2. A receiving device supporting a plurality of radio links in a mobile communication network, the receiving device comprising:
a transceiver configured to transmit and receive a signal; and
a processor coupled with the transceiver and configured to:
generate feedback information on a plurality of links,
determine a transmission mode for a transmitting device to distribute packets to the plurality of links, the feedback information including the transmission mode,
transmit the feedback information to the transmitting device; and
receive, from the transmitting device, packets transmitted based on the feedback information,
wherein the transmission mode is one of:
a splitting mode for distributing different packets to the plurality of links based on weight determined based on the feedback information,
a duplicating mode for distributing the same packets to the plurality of links, and
a pre-splitting mode for distributing packets to a specific link among the plurality of links, and
wherein the processor is further configured to:
transition the transmitting device operating in the duplicating mode to the pre-splitting mode based on a condition being met that a data rate of a specific link among the plurality of links is equal to or greater than a predetermined threshold value,
transition the transmitting device operating in the splitting mode to the pre-splitting mode based on a condition being met that the data rate of a specific link among the plurality of links increases by a predetermined multiple or more, and
transition the transmitting device operating in the pre-splitting mode to the splitting mode based on a condition being met that data rates of other links drop to be equal to or less than a predetermined value.

3. The device of claim 2, wherein the processor is further configured to reorder the packets and deliver the reordered packets to an upper layer or another node.

4. A method performed by a transmitting device supporting a plurality of radio links in a mobile communication network, the method comprising:
receiving feedback information on a plurality of links from a receiving device;
determining a transmission mode for distributing packets based on the feedback information, the feedback information including the transmission mode for distributing the packets;
distributing packets to the plurality of links based on the feedback information; and
transmitting the distributed packets through the plurality of links,
wherein the transmission mode includes:
a splitting mode for distributing different packets to the plurality of links based on weight, wherein the weight is determined based on the feedback information,
a duplicating mode for distributing the same packets to the plurality of links, and
a pre-splitting mode for distributing packets to a specific link among the plurality of links, and
wherein the determining of the transmission mode further comprises:
transitioning the transmitting device operating in the duplicating mode to the pre-splitting mode, in case that the feedback information indicates that a data rate of a specific link among the plurality of links is equal to or greater than a predetermined threshold value; and
transitioning the transmitting device operating in the splitting mode to the pre-splitting mode, in case that the feedback information indicates that the data rate of a specific link among the plurality of links increases by a predetermined multiple or more, and
transitioning the transmitting device operating in the pre-splitting mode to the splitting mode, in case that the feedback information indicates that data rates of other links drop to be equal to or less than a predetermined value.

5. A method performed by a receiving device supporting a plurality of radio links in a mobile communication network, the method comprising:
generating feedback information on a plurality of links;
determining a transmission mode for a transmitting device to distribute packets to the plurality of links, the feedback information including the transmission mode;
transmitting the feedback information to the transmitting device; and
receiving, from the transmitting device, packets transmitted based on the feedback information,
wherein the transmission mode is one of:
a splitting mode for distributing different packets to the plurality of links based on weight determined based on the feedback information,
a duplicating mode for distributing the same packets to the plurality of links, or
a pre-splitting mode for distributing packets to a specific link among the plurality of links, and
wherein the method further comprises:
transitioning the transmitting device operating in the duplicating mode to the pre-splitting mode based on a condition being met that a data rate of a specific link among the plurality of links is equal to or greater than a predetermined threshold value; and
transitioning the transmitting device operating in the splitting mode to the pre-splitting mode based on a condition being met that the data rate of a specific link among the plurality of links increases by a predetermined multiple or more, and
transition the transmitting device operating in the pre-splitting mode to the splitting mode based on a condition being met that data rates of other links drop to be equal to or less than a predetermined value.

6. The method of claim 5, further comprising reordering the packets and delivering the reordered packets to an upper layer or another node.

* * * * *